US010396998B2

(12) United States Patent
Tang et al.

(10) Patent No.: US 10,396,998 B2
(45) Date of Patent: Aug. 27, 2019

(54) METHOD FOR DYNAMIC AUTHENTICATION OF AN OBJECT

(71) Applicant: MASTERCARD ASIA/PACIFIC PTE LTD, Singapore (SG)

(72) Inventors: Hao Tang, Singapore (SG); Xijing Wang, Singapore (SG); Senxian Zhuo, Singapore (SG); Yong-How Chin, Singapore (SG); Jiaming Li, Singapore (SG); Bensam Joyson, Singapore (SG); Donghao Huang, Singapore (SG); Martin Collings, Blakehurst (AU); Preshant Sridhar, Pyrmont (AU); Perry Kick, Parkdale (AU)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 263 days.

(21) Appl. No.: 15/401,614

(22) Filed: Jan. 9, 2017

(65) Prior Publication Data

US 2017/0201377 A1  Jul. 13, 2017

(30) Foreign Application Priority Data

Jan. 11, 2016  (SG) .............. 10201600192T

(51) Int. Cl.
*H04L 9/32* (2006.01)
*H04L 29/06* (2006.01)
(Continued)

(52) U.S. Cl.
CPC .............. *H04L 9/3247* (2013.01); *H04L 9/12* (2013.01); *H04L 9/3297* (2013.01); *H04L 63/06* (2013.01); *H04L 63/08* (2013.01); *H04L 63/083* (2013.01); *H04W 4/80* (2018.02); *H04W 12/04* (2013.01); *H04W 12/06* (2013.01); *H04W 12/10* (2013.01);
(Continued)

(58) Field of Classification Search
CPC ....... H04L 9/3247; H04L 9/12; H04L 9/3297; H04L 63/06; H04L 63/08; H04L 63/083; H04L 2209/805; H04L 2463/121; H04W 4/80; H04W 12/04; H04W 12/06; H04W 12/10; H04W 12/12
See application file for complete search history.

(56) References Cited

U.S. PATENT DOCUMENTS 9,172,698 B1 * 10/2015 Evans ................ H04L 63/0853
9,419,803 B2 *  8/2016 Teuwen ............. G06K 7/10267
(Continued)

FOREIGN PATENT DOCUMENTS

CN    102930307 A     2/2013
CN    105024824 A    11/2015

OTHER PUBLICATIONS

International Search Report and Written Opinion issued by the International Search Authority dated Mar. 27, 2017 in corresponding Singapore Application No. PCT/SG2016/050626 (12 pages)

*Primary Examiner* — Meng Li
*Assistant Examiner* — Alexander R Lapian
(74) *Attorney, Agent, or Firm* — Buchanan Ingersoll & Rooney PC

(57) ABSTRACT

There is provided a data processor implemented method for dynamic authentication of an object. There is also provided non-transitory computer readable storage mediums and systems for carrying out dynamic authentication of an object.

20 Claims, 5 Drawing Sheets

(51) Int. Cl.
*H04W 12/04* (2009.01)
*H04W 12/06* (2009.01)
*H04W 12/10* (2009.01)
*H04W 4/80* (2018.01)
*H04L 9/12* (2006.01)

(52) U.S. Cl.
CPC .. *H04L 2209/805* (2013.01); *H04L 2463/121* (2013.01)

(56) References Cited

U.S. PATENT DOCUMENTS

| | | |
|---|---|---|
| 2007/0051816 A1 | 3/2007 | Chu |
| 2012/0234908 A1 | 9/2012 | Wang et al. |
| 2015/0134552 A1 | 5/2015 | Engels et al. |
| 2015/0186541 A1* | 7/2015 | Vega ................ G06F 16/9566 705/26.8 |
| 2015/0189505 A1* | 7/2015 | Marien ............ H04L 63/0838 380/270 |
| 2015/0208245 A1* | 7/2015 | Robinton ............ H04L 9/3247 455/411 |
| 2015/0235235 A1 | 8/2015 | Koren |

\* cited by examiner

METHOD FOR DYNAMIC AUTHENTICATION OF AN OBJECT

TECHNICAL FIELD

Embodiments of the present invention relate to a method for dynamic authentication of an object.

BACKGROUND

Counterfeiting of goods is a substantial problem in many product groups such as, for example, leather goods, alcoholic drinks, cosmetic products, clothing, consumer electronics, pharmaceutical goods, and so forth. The counterfeiting of goods is undesirable for both the originators of the goods (for example, lost revenue) and for the consumers (for example, poor quality of goods, hazards to health).

Currently, there are solutions relying on NFC technology to tackle the problem of counterfeiting. In one solution, an app is installed on a mobile device to interface with an NFC device associated with a "genuine" product, such that interfacing of the NFC device with the mobile device enables authentication of whether the product is "genuine". Typically, the app opens and reads data transmitted from the NFC device, with the data being processed either in the phone, or on a remote server, to determine the authenticity of the product. As an app needs to be installed on the mobile device, the app will take up resources of the mobile device.

In addition, data transmitted from the NFC device is typically independent of a time parameter, and this can compromise the authentication process.

Clearly, there are issues associated with the existing solutions relying on NFC technology to tackle the problem of counterfeiting.

SUMMARY

In a first aspect, there is provided a data processor implemented method for dynamic authentication of an object. The method comprises generating, at an identification device associated with the object, a digital signature at pre-defined intervals, the digital signature including a generation time-stamp; transmitting the digital signature to an authentication server, the authentication server being synchronised with the identification device; verifying, at the authentication server, the digital signature; and transmitting, from the authentication server to a user device, a result of the verification.

The method can further include interfacing with a wireless transmission device to enable access to a pre-determined web page via a web browser. Alternatively, the method can further include interfacing with a visual indicia processing device to enable access to a pre-determined web page via a web browser.

Preferably, adjacent ones of the pre-defined intervals are at least one minute apart and the digital signature is generated using identification information of the object, and a private key.

It is preferable that the wireless transmission device is NFC enabled, and the digital signature is encoded in NFC Data Exchange Format (NDEF). The NDEF message can be of type URI, and can include a string as its payload. The string can include encrypted data based on the private key and data of the object.

The digital signature can also be encoded in a two dimensional barcode which includes a string as its payload. The string can also include encrypted data based on the private key and data of the object.

In a second aspect, there is provided a non-transitory computer readable storage medium embodying thereon a program of computer readable instructions which, when executed by one or more processors of a server in communication with at least one mobile device, cause the server to perform a method for dynamic authentication of an object, the method being embodied in the steps of receiving a digital signature, the digital signature being generated at pre-defined intervals, and the digital signature including a generation time-stamp; verifying the digital signature; and transmitting a result of the verification. It is advantageous that the server is synchronised with an identification device associated with the object.

It is preferable that adjacent ones of the pre-defined intervals are at least one minute apart.

Preferably, the digital signature is generated using identification information of the object, and a private key. The digital signature can be encoded in NFC Data Exchange Format (NDEF). The NDEF message can be of type URI, and can include a string as its payload. The string can include encrypted data based on the private key and data of the object. Alternatively, the digital signature can be encoded in a two dimensional barcode. The two dimensional barcode can include a string as its payload and the string can include encrypted data based on the private key and data of the object.

In a third aspect, there is provided a non-transitory computer readable storage medium embodying thereon a program of computer readable instructions which, when executed by one or more processors of a mobile device in communication with at least one other server, cause the mobile device to perform a method for dynamic authentication of an object. The method is embodied in the steps of receiving a digital signature, the digital signature generated at pre-defined intervals, and the digital signature including a generation time-stamp; accessing a pre-determined web page; transmitting the digital signature to enable verification of the digital signature; and indicating a result of the verification. It is advantageous that the at least one server is synchronised with an identification device associated with the object. The result of the verification can be provided via a web browser.

It is preferable that adjacent ones of the pre-defined intervals are at least one minute apart.

Preferably, the digital signature is generated using identification information of the object, and a private key. The digital signature can be encoded in NFC Data Exchange Format (NDEF). The NDEF message can be of type URI, and can include a string as its payload. The string can include encrypted data based on the private key and data of the object. Alternatively, the digital signature can be encoded in a two dimensional barcode. The two dimensional barcode can include a string as its payload and the string can include encrypted data based on the private key and data of the object.

In a fourth aspect, there is provided a system for dynamic authentication of an object. The system comprises a wireless transmission device including an identification device associated with the object; a mobile device configured to interface with the wireless transmission device; and a server configured to verify a digital signature transmitted at pre-defined intervals via the wireless transmission device, the digital signature including a generation time-stamp. It is advantageous that the server is synchronised with the identification device.

It is preferable that adjacent ones of the pre-defined intervals are at least one minute apart.

Preferably, the digital signature is generated using identification information of the object, and a private key. The digital signature can be encoded in NFC Data Exchange Format (NDEF). The NDEF message can be of type URI, and can include a string as its payload. The string can include encrypted data based on the private key and data of the object.

In another aspect, there is provided a system for dynamic authentication of an object. The system comprises a visual indicator including an identification device associated with the object; a mobile device configured to interface with the visual indicator; and a server configured to verify a digital signature transmitted via the visual indicator at pre-defined intervals, the digital signature including a generation timestamp. It is advantageous that the server is synchronised with the identification device.

It is preferable that adjacent ones of the pre-defined intervals are at least one minute apart.

Preferably, the digital signature is generated using identification information of the object, and a private key. The digital signature can be encoded in a two dimensional barcode, where the two dimensional barcode includes a string as its payload. The string can include encrypted data based on the private key and data of the object.

DESCRIPTION OF FIGURES

In order that the present invention may be fully understood and readily put into practical effect, there shall now be described by way of non-limitative example only, certain embodiments of the present invention, the description being with reference to the accompanying illustrative figures, in which.

DETAILED DESCRIPTION

Certain embodiments of the present invention are described with reference to FIGS. 1 and 2. Embodiments provide a data processor implemented method for dynamic authentication of an object. The method can be used to determine if the object is from a genuine source or if the object is a counterfeit object. Moreover, the object can be selected from product groups, such as, for example, leather goods, alcoholic drinks, cosmetic products, clothing, consumer electronics, pharmaceutical goods, and so forth. In at least some embodiments, the method for dynamic authentication of an object provides a user with assurance with regard to a source of origin for the object.

Figure 1:
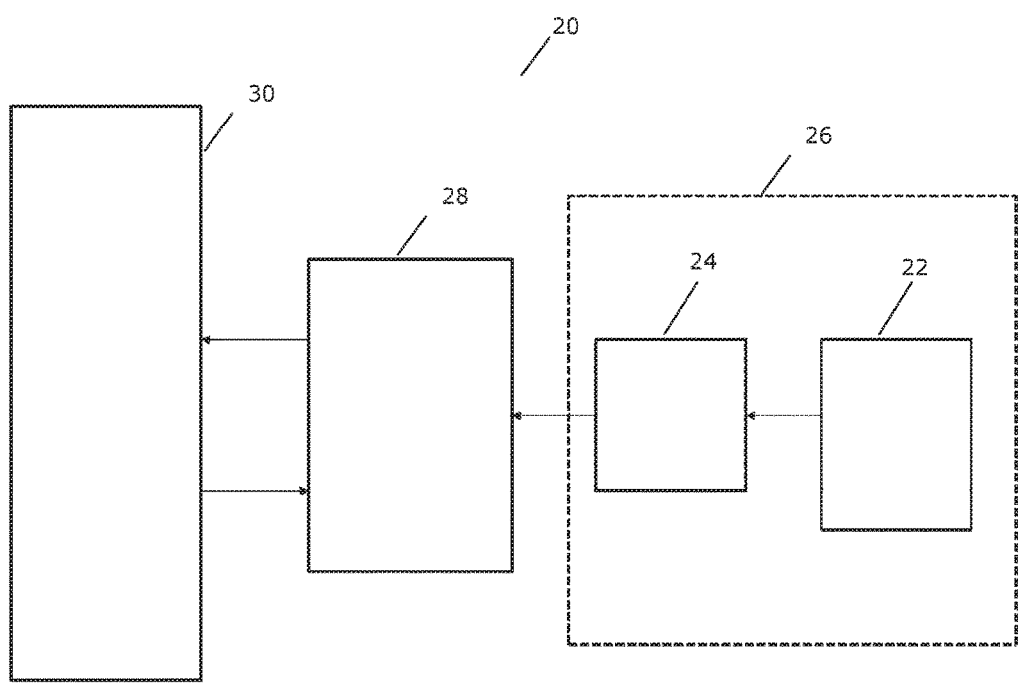
FIG. 1 shows a schematic overview of a system according to a first embodiment of the present invention.
Figure 2:
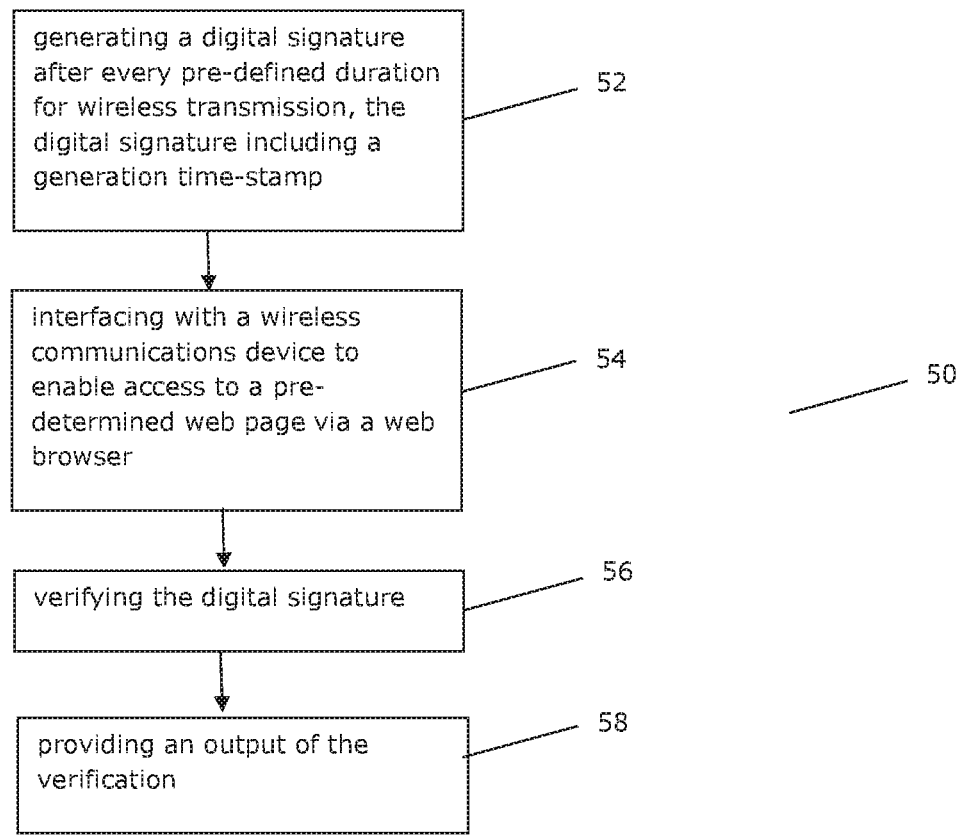
FIG. 2 shows a process flow of a data processor implemented method according to certain embodiments of the present invention.

FIG. 2 shows the steps of an exemplary method 50, while FIG. 1 shows a system in which the steps are carried out. The method 50 will be depicted in a flow diagram (FIG. 2), and each of the blocks of the flow diagram may be executed by a data processor(s) or a portion of the data processor (for example, a single core of a multi-core processor). The processes may be embodied in a non-transient machine-readable and/or computer-readable medium for configuring a computer system to execute the method. A software module(s) may be stored within and/or transmitted to a computer system memory to configure the computer system to carry out the tasks indicated in each of the blocks of the flow diagram.

Figure 3:
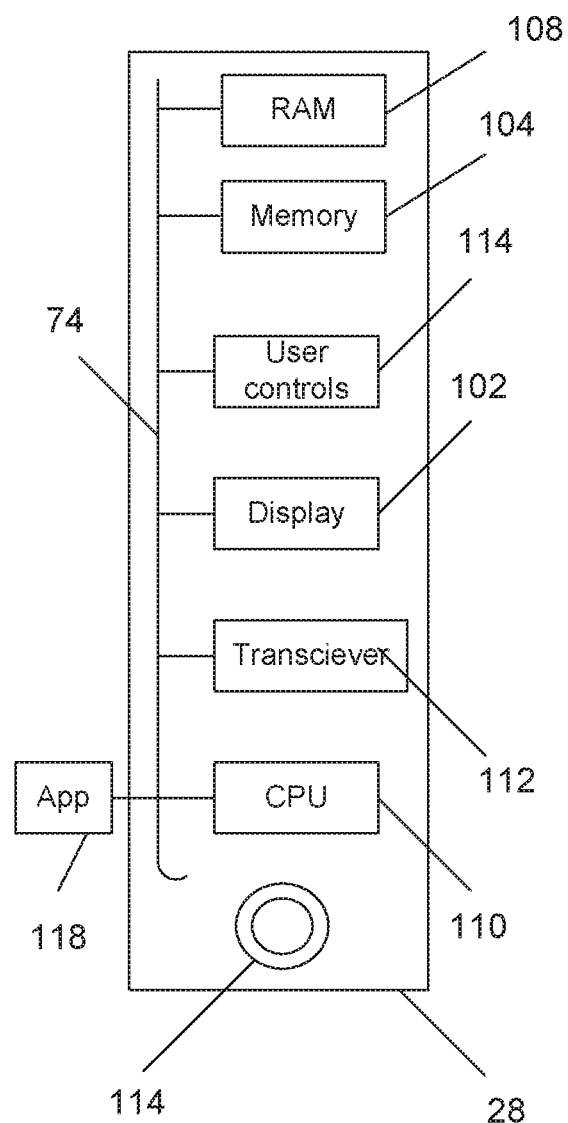
FIG. 3 shows a schematic view of a mobile device used in the method shown in FIG. 2.

The method 50 can be carried out on a mobile device 28 (as shown in FIG. 3). The mobile device 100 is a handheld device such as a smartphone or a tablet computer such as one manufactured by Apple™, LG™, HTC™, Samsung™, and Motorola™. An exemplary embodiment of the mobile device 28 is shown in FIG. 3. As shown, the device 28 includes the following components in electronic communication via a bus 106:

a display 102;
non-volatile memory 104;
random access memory ("RAM") 108;
N processing components 110;
a transceiver component 112 that includes N transceivers; and
user controls 114.

Although the components depicted in FIG. 3 represent physical components, FIG. 3 is not intended to be a hardware diagram; thus many of the components depicted in FIG. 3 may be realized by common constructs or distributed among additional physical components. Moreover, it is certainly contemplated that other existing and yet-to-be developed physical components and architectures may be utilized to implement the functional components described with reference to FIG. 3.

The display 102 generally operates to provide a presentation of content to a user, and may be realized by any of a variety of displays (e.g., CRT, LCD, HDMI, micro-projector and OLED displays). And in general, the non-volatile memory 104 functions to store (e.g. persistently store) data and executable code including code that is associated with the functional components of the method. In some embodiments, for example, the non-volatile memory 104 includes bootloader code, modem software, operating system code, file system code, and code to facilitate the implementation of one or more portions of the method as well as other components well known to those of ordinary skill in the art that are not depicted for simplicity.

In many implementations, the non-volatile memory 104 is realized by flash memory (e.g., NAND or ONENAND memory), but it is certainly contemplated that other memory types may be utilized as well. Although it may be possible to execute the code from the non-volatile memory 104, the executable code in the non-volatile memory 104 is typically loaded into RAM 108 and executed by one or more of the N processing components 110.

The N processing components 110 in connection with RAM 108 generally operate to execute the instructions stored in non-volatile memory 104 to effectuate the functional components. As one of ordinarily skill in the art will appreciate, the N processing components 110 may include a video processor, modem processor, DSP, graphics processing unit (GPU), and other processing components.

The transceiver component 112 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

Figure 4:
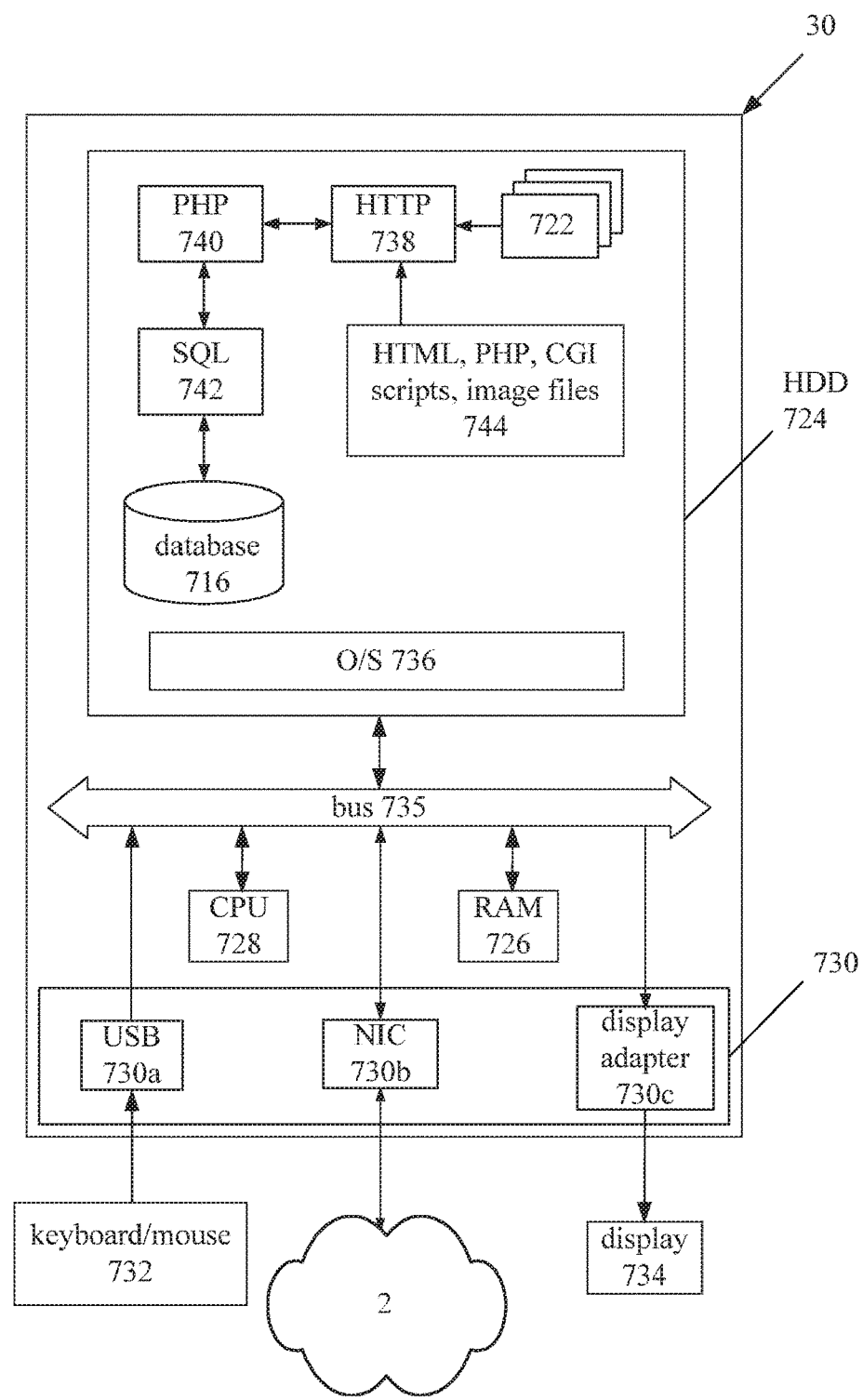
FIG. 4 shows a schematic view of a server used in the method shown in FIG. 2.

The method 50 can also be carried out by a server 30 as shown in FIG. 4. The server 30 is able to communicate with the mobile device 28 over a communications network 2 using standard communication protocols.

It should be appreciated that the method 50 can be configured to be performed in a variety of ways. The steps can be implemented entirely by software to be executed on standard computer server hardware, which may comprise one hardware unit or different computer hardware units distributed over various locations, some of which may require the communications network 2 for communication. A number of the components or parts thereof may also be implemented by application specific integrated circuits (ASICs) or field programmable gate arrays.

In FIG. 4, the server 30 is a commercially available server computer system based on a 32 bit or a 64 bit Intel architecture, and the processes and/or methods executed or performed by the computer server 30 are implemented in the form of programming instructions of one or more software components or modules 722 stored on non-volatile (e.g., hard disk) computer-readable storage 724 associated with the server 30. At least parts of the software modules 722 could alternatively be implemented as one or more dedicated hardware components, such as application-specific integrated circuits (ASICs) and/or field programmable gate arrays (FPGAs).

The server 30 includes at least one or more of the following standard, commercially available, computer components, all interconnected by a bus 735:
1. random access memory (RAM) 726;
2. at least one computer processor 728, and
3. external computer interfaces 730:
   a. universal serial bus (USB) interfaces 730a (at least one of which is connected to one or more user-interface devices, such as a keyboard, a pointing device (e.g., a mouse 732 or touchpad),
   b. a network interface connector (NIC) 730b which connects the server 12 to a data communications network, such as the Internet 2; and
   c. a display adapter 730c, which is connected to a display device 734 such as a liquid-crystal display (LCD) panel device.

The server 30 includes a plurality of standard software modules, including:
1. an operating system (OS) 736 (e.g., Linux or Microsoft Windows);
2. web server software 738 (e.g., Apache, available at http://www.apache.org);
3. scripting language modules 740 (e.g., personal home page or PHP, available at http://www.php.net, or Microsoft ASP); and
4. structured query language (SQL) modules 742 (e.g., MySQL, available from http://www.mysql.com), which allow data to be stored in and retrieved/accessed from an SQL database 716.

Together, the web server 738, scripting language 740, and SQL modules 742 provide the server 30 with the general ability to allow users of the Internet 2 with mobile device 100 equipped with standard web browser software to access the server 30 and in particular to provide data to and receive data from the database 716. It will be understood by those skilled in the art that the specific functionality provided by the server 30 to such users is provided by scripts accessible by the web server 738, including the one or more software modules 722 implementing the processes performed by the server 30, and also any other scripts and supporting data 744, including markup language (e.g., HTML, XML) scripts, PHP (or ASP), and/or CGI scripts, image files, style sheets, and the like.

The boundaries between the modules and components in the software modules 722 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of the processes of the server 30 may be executed by a module (of software modules 722) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The server 30 normally processes information according to a program (a list of internally stored instructions such as a particular application program and/or an operating system) and produces resultant output information via input/output (I/O) devices 730. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Referring to FIG. 2, in one embodiment, there is provided a data processor implemented method 50 for dynamic authentication of an object. The method 50 comprises generating a digital signature after every pre-defined duration for wireless transmission, the digital signature including a generation time-stamp (52). It should be appreciated that generating the digital signature can be carried out, for example, within a single wireless transmission device, a separate wireless transmission device/controller with timer combination, or the like. The wireless transmission device can be configured to rely on NFC technology. For example, a product ID (eg. P123 or similar) and a private key (eg. PrivK123 is used for illustrative purposes) may be used, together with coordinated universal time (UTC) to generate the digital signature. The private key is an array of binary data from an asymmetric public-private key pair. For example, a first string is generated with product ID and the generation time-stamp (eg. P123-YYYYM$_{th}$M$_{th}$DDHHM$_{in}$-M$_{in}$ or similar) and is associated together with a digital signature with private key (eg. S or similar). The digital signature is a random binary array encrypted based on the private key and object data (product ID).

The digital signature can be provided in NFC data exchange format (NDEF), for example, an NDEF message which is of type URI and which includes the string: http://{authentication-site-url}/{brand}/{productId}/{signature} as its payload. In some embodiments which will be described in greater detail in a subsequent section, the digital signature can also be provided in a two dimensional barcode (matrix barcode) such as a QR code. The pre-defined duration can be at least one minute. By making the pre-defined duration more than a minute, it is possible to avoid issues which may arise when data transmission rates are low.

The method 50 can also comprise interfacing with the wireless transmission device to enable access to the authentication-site-URL via a web browser (54). It should be appreciated that interfacing with the wireless transmission device can be carried out using NFC. Interfacing with the wireless transmission device enables identification information of the object to be transmitted (in NFC data exchange format (NDEF), for example, an NDEF message which is of type URI and which includes the string: http://{authentication-site-url}/{brand}/{productId}/{signature}) and to provide the URL of the authentication site.

Subsequently, the digital signature is verified (56), wherein the verification of the digital signature is carried out by retrieving information from the authentication site URL like product ID (eg. P123 or similar) plus the digital signature (eg. S or similar) and the information is compared to a newly generated second string with product ID and generation time-stamp (eg. P123-YYYYM$_{th}$M$_{th}$DDHHM$_{in}$M$_{in}$ or similar). The generation time stamp is generated at the authentication site URL, specifically a server hosting the authentication site. A public key (eg. PubK123 or similar) which is paired with the private key (for example, using an algorithm or any possible process) is associated with the product ID, and is retrieved to decrypt the digital signature and to enable the verification of the digital signature.

Finally, the method 50 also comprises providing an output of the verification (58). The output can be a positive or negative indication with regard to the verification.

There is also provided a non-transitory computer readable storage medium embodying thereon a program of computer readable instructions which, when executed by one or more processors of a server (for example, server 30) in communication with at least one mobile device (for example, mobile device 28), cause the server 30 to perform a method for dynamic authentication of an object.

The method includes the steps of receiving a digital signature, the digital signature being generated after a pre-defined duration, and the digital signature including a generation time-stamp. For example, a product ID (eg. P123 or similar) and a private key (eg. PrivK123 is used for illustrative purposes) may be used, together with coordinated universal time (UTC) to generate the digital signature. The private key is an array of binary data from an asymmetric public-private key pair. For example, a first string is generated with product ID and the generation time-stamp (eg. P123-YYYYM$_{th}$M$_{th}$DDHHM$_{in}$M$_{in}$ or similar) and is associated together with a digital signature with private key (eg. S or similar). The digital signature is a random binary array encrypted based on the private key and object data (product ID).

The digital signature can be provided in NFC data exchange format (NDEF), for example, an NDEF message which is of type URI and which includes the string: http://{authentication-site-url}/{brand}/{productId}/{signature} as its payload. In some embodiments which will be described in greater detail in a subsequent section, the digital signature can also be provided in a two dimensional barcode (matrix barcode) such as, for example, a QR code, Semacode, High Capacity Colour Barcode and so forth. The pre-defined duration can be at least one minute. By making the pre-defined duration more than a minute, it is possible to avoid issues which may arise when data transmission rates are low.

The method can include verifying the digital signature. The verification is carried out by retrieving information from an authentication site URL like product ID (eg. P123 or similar) plus the digital signature (eg. S or similar) and the information is compared to a newly generated second string with product ID and generation time-stamp (eg. P123-YYYYM$_{th}$M$_{th}$DDHHM$_{in}$M$_{in}$ or similar). The generation time stamp is generated at the authentication site URL, specifically a server hosting the authentication site. A public key (eg. PubK123 or similar) which is paired with the private key (for example, using an algorithm or any possible process) is associated with the product ID, and is retrieved to decrypt the digital signature and to enable the verification of the digital signature.

Finally, the method also includes transmitting an output of the verification, whereby the output can be a positive or negative indication with regard to the verification.

There is also provided a non-transitory computer readable storage medium embodying thereon a program of computer readable instructions which, when executed by one or more processors of a mobile device (for example, mobile device 28) in communication with at least one other server (for example, server 30), cause the mobile device 28 to perform a method for dynamic authentication of an object.

The method includes the steps of receiving a digital signature, the digital signature being generated after a pre-defined duration, and the digital signature including a generation time-stamp. For example, a product ID (eg. P123 or similar) and a private key (eg. PrivK123 is used for illustrative purposes) may be used, together with coordinated universal time (UTC) to generate the digital signature. The private key is an array of binary data from an asymmetric public-private key pair. For example, a first string is generated with product ID and the generation time-stamp (eg. P123-YYYYM$_{th}$M$_{th}$DDHHM$_{in}$M$_{in}$ or similar) and is associated together with a digital signature with private key (eg. S or similar). The digital signature is a random binary array encrypted based on the private key and object data (product ID).

The digital signature can be provided in NFC data exchange format (NDEF), for example, an NDEF message which is of type URI and which includes the string: http://{authentication-site-url}/{brand}/{productId}/{signature} as its payload. In some embodiments which will be described in greater detail in a subsequent section, the digital signature can also be provided in a two dimensional barcode (matrix barcode) such as, for example, a QR code, Semacode, High Capacity Colour Barcode and so forth. The pre-defined duration can be at least one minute. By making the pre-defined duration more than a minute, it is possible to avoid issues which may arise when data transmission rates are low.

The method includes accessing a pre-determined authentication URL (possibly on the mobile device 28), and transmitting the digital signature to enable verification of the digital signature. The verification of the digital signature is carried out by retrieving information from the authentication site URL like product ID (eg. P123 or similar) plus the digital signature (eg. S or similar) and the information is compared to a newly generated second string with product ID and generation time-stamp (eg. P123-YYYYM$_{th}$M$_{th}$-DDHHM$_{in}$M$_{in}$ or similar). The generation time stamp is generated at the authentication site URL, specifically a server hosting the authentication site. A public key (eg. PubK123 or similar) which is paired with the private key (for example, using an algorithm or any possible process) is associated with the product ID, and is retrieved to decrypt the digital signature and to enable the verification of the digital signature.

Finally, the method also includes indicating an output of the verification, whereby the output can be a positive or negative indication with regard to the verification. The indication of the output of the verification is via a web browser that can be found on the mobile device 28.

Referring to FIG. 1, there is provided a system 20 for dynamic authentication of an object 26. The system 20 can be used to determine if the object 26 is from a genuine source or if the object 26 is a counterfeit project. Moreover, the object 26 can be selected from product groups, such as, for example, leather goods, alcoholic drinks, cosmetic products, clothing, consumer electronics, pharmaceutical goods, and so forth. In at least some embodiments, the system 20 aids a user in obtaining assurance with regard to a source of origin for the object 26. The system 20 can be employed to facilitate the method 50.

The system 20 comprises a wireless transmission device 24. The wireless transmission device 24 can be configured to rely on NFC technology. The wireless transmission device 24 can be communicatively coupled to a controller with timer 22 (as shown), or the controller with timer 22 can be integral with the wireless transmission device 24. For example, the controller with timer 22 is pre-set with a product ID (eg. P123 or similar) and a private key (eg. PrivK123 is used for illustrative purposes). In addition, the controller with timer 22 is also pre-set to conform with coordinated universal time (UTC) and is configured with a pre-defined time duration trigger of at least one minute to generate a digital signature by using the private key. The private key is an array of binary data from an asymmetric public-private key pair. For example, a first string is generated with product ID and generation time-stamp (eg. P123-YYYYM$_{th}$M$_{th}$DDHHM$_{in}$M$_{in}$ or similar) and is associated together with a signature with private key (eg. S or similar). The digital signature is a random binary array encrypted based on the private key and object data (product ID).

The system 20 also includes a mobile device 28 configured to interface with the wireless transmission device 24, and a server 30 configured to verify the digital signature transmitted via the wireless transmission device 24. The mobile device 28 is configured to receive identification information of the object 26 (in NFC data exchange format (NDEF), for example, an NDEF message which is of type URI and which includes the string: http://{authentication-site-url}/{brand}/{productId}/{signature} as its payload and to access the URL of the authentication site.

Subsequently, in response to the mobile device 28 sending a verification request to the server 30, the server 30 is configured to retrieve information from the URL like product ID (eg. P123 or similar) plus the digital signature (eg. S or similar) and is configured to generate a second string with product ID and generation time-stamp (eg. P123-YYYYM$_{th}$M$_{th}$DDHHM$_{in}$M$_{in}$ or similar). The server 30 is configured to synchronise with the controller with timer 22. The server 30 is also configured to retrieve a public key (eg. PubK123 or similar) associated with the product ID, the public key being stored on the server 30. The verification of the digital signature is carried out at the server 30 using the public key and the result is transmitted to the mobile device 28.

The digital signature can be part of identification information of the object and can be provided in NFC data exchange format (NDEF), for example, an NDEF message which is of type URI and which includes the string: http://{authentication-site-url}/{brand}/{productId}/{signature} as its payload. In some embodiments which will be described in greater detail in a subsequent section, the digital signature can also be provided in a two dimensional barcode (matrix barcode) such as, for example, a QR code, Semacode, High Capacity Colour Barcode and so forth. In addition, the pre-defined duration can be at least one minute. By making the pre-defined duration more than a minute, it is possible to avoid issues which may arise when data transmission rates are low.

Figure 5:
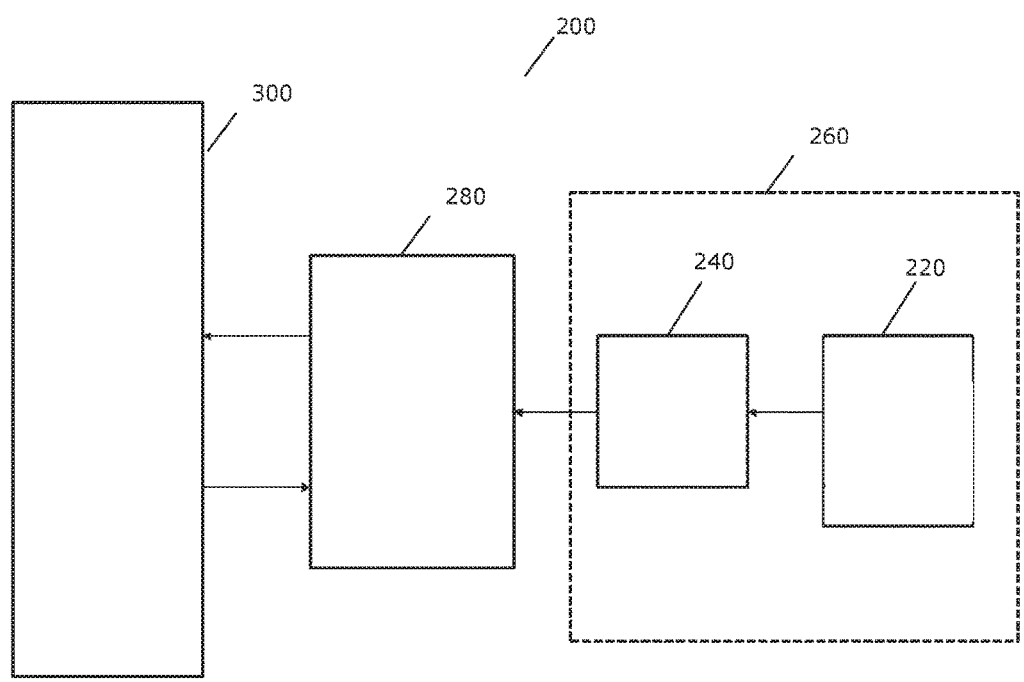
FIG. 5 shows a schematic overview of a system according to a second embodiment of the present invention.

Referring to FIG. 5, there is provided a system 200 for dynamic authentication of an object 260. The system 200 can be used to determine if the object 260 is from a genuine source or if the object 260 is a counterfeit project. Moreover, the object 260 can be selected from product groups, such as, for example, leather goods, alcoholic drinks, cosmetic products, clothing, consumer electronics, pharmaceutical goods, and so forth. In at least some embodiments, the system 200 aids a user in obtaining assurance with regard to a source of origin for the object 260. The system 200 can also be employed to facilitate the method 500.

The system 200 comprises a visual indicator 240. The visual indicator 240 can be an e-ink display. The visual indicator 240 can be communicatively coupled to a controller with timer 220 (as shown), or the controller with timer 220 can be integral with the visual indicator 240. For example, the controller with timer 220 is pre-set with a product ID (eg. P123 or similar) and a private key (eg. PrivK123 is used for illustrative purposes). In addition, the controller with timer 220 is also pre-set to conform with coordinated universal time (UTC) and is configured with a pre-defined time duration trigger of at least one minute to generate a digital signature by using the private key. The private key is an array of binary data from an asymmetric public-private key pair. For example, a first string is generated with product ID and generation time-stamp (eg. P123-YYYYM$_{th}$M$_{th}$DDHHM$_{in}$M$_{in}$ or similar) and is associated together with a signature with private key (eg. S or similar). The digital signature is a random binary array encrypted based on the private key and object data (product ID).

The system 200 also includes a mobile device 280 configured to interface with the visual indicator 240, and a server 300 configured to verify the digital signature transmitted via the visual indicator 240. The mobile device 280 can use an integrated camera to interface with the visual indicator 240. The mobile device 280 is configured to receive identification information of the object 260 in a two dimensional barcode (matrix barcode) such as, for example, a QR code, Semacode, High Capacity Colour Barcode and so forth, for example, http://{authentication-site-url}/{brand}/{productId}/{signature} as its payload and to access the URL of the authentication site.

Subsequently, in response to the mobile device 280 sending a verification request to the server 300, the server 300 is configured to retrieve information from the URL like product ID (eg. P123 or similar) plus the digital signature (eg. S or similar) and is configured to generate a second string with product ID and generation time-stamp (eg. P123-

YYYYM$_{th}$M$_{th}$DDHHM$_{in}$M$_{in}$ or similar). The server 300 is configured to synchronise with the controller with timer 220. The server 300 is also configured to retrieve a public key (eg. PubK123 or similar) associated with the product ID, the public key being stored on the server 300. The verification of the digital signature is carried out at the server 300 using the public key and the result is transmitted to the mobile device 280.

The digital signature can be part of identification information of the object and can be provided in QR format, for example, http://{authentication-site-url}/{brand}/{productId}/{signature} as its payload. In addition, the pre-defined duration can be at least one minute. By making the pre-defined duration more than a minute, it is possible to avoid issues which may arise when data transmission rates are low.

It should be appreciated that the systems 20/200 and method 50 enables a user to ascertain if an object 26/260 is genuine regardless of whether the object 26/260 is brand new or used. The provision of such assurance for the user is convenient and valuable, particularly when seeking to determine a value of an object 26/260.

Whilst there have been described in the foregoing description preferred embodiments of the present invention, it will be understood by those skilled in the technology concerned that many variations or modifications in details of design or construction may be made without departing from the present invention.

The invention claimed is:

1. A data processor implemented method for dynamic authentication of an object comprising:
    generating, at an identification device associated with the object, a digital signature at pre-defined intervals, the digital signature including a first string having a first generation time-stamp and data of the object;
    interfacing with a wireless transmission device to enable access to a pre-determined web page via a web browser, wherein the wireless transmission device is NFC enabled, the digital signature being encoded in NFC Data Exchange Format (NDEF), the NDEF message being of type URI, and including the first string as its payload, wherein data in the first string being encrypted based on a private key;
    transmitting the digital signature to an authentication server via the web browser, the authentication server being synchronised with the identification device;
    verifying, at the authentication server, the digital signature by comparing the digital signature with a generated signature including a second string based on the data of the object and a second generation time-stamp; and
    transmitting, from the authentication server to a user device, a result of the verification.

2. The method of claim 1, wherein adjacent ones of the pre-defined intervals are at least one minute apart.

3. The method of claim 1, wherein the digital signature is generated using the data of the object, which includes identification information of the object, and a private key.

4. The method of claim 3, further including interfacing with a visual indicia processing device to enable access to a pre-determined web page via a web browser.

5. The method of claim 4, wherein the digital signature is encoded in a two dimensional barcode, the two dimensional barcode including a string as its payload, the string including encrypted data based on the private key and data of the object.

6. A non-transitory computer readable storage medium embodying thereon a program of computer readable instructions which, when executed by one or more processors of a server in communication with at least one mobile device, cause the server to perform a method for dynamic authentication of an object, the method being embodied in the steps of:
    receiving a digital signature, the digital signature being generated at pre-defined intervals, and the digital signature including a first string having a first generation time-stamp and data of the object, the digital signature being encoded in NFC Data Exchange Format (NDEF), the NDEF message being of type URI, and including the first string as its payload, wherein data in the first string being encrypted based on a private key;
    verifying the digital signature by comparing the digital signature to a signature generated by the server, the server generated signature including a second string having a second generation time-stamp and the data of the object; and
    transmitting a result of the verification, wherein the server is synchronised with an identification device associated with the object.

7. The storage medium of claim 6, wherein adjacent ones of the pre-defined intervals are at least one minute apart.

8. The storage medium of claim 6, wherein the digital signature is generated using the data of the object, which includes identification information of the object, and a private key.

9. The storage medium of claim 8, wherein the digital signature is encoded in a two dimensional barcode, the two dimensional barcode including a string as its payload, the string including encrypted data based on the private key and data of the object.

10. A non-transitory computer readable storage medium embodying thereon a program of computer readable instructions which, when executed by one or more processors of a mobile device in communication with at least one other server, cause the mobile device to perform a method for dynamic authentication of an object, the method being embodied in the steps of:
    receiving a digital signature, the digital signature generated at pre-defined intervals, and the digital signature including a first string with a generation time-stamp and an identifier of the object;
    accessing a pre-determined web page;
    transmitting the digital signature to enable verification of the digital signature, wherein for transmission the digital signature being encoded in NFC Data Exchange Format (NDEF), the NDEF message being of type URI, and including the first string as its payload, wherein data in the first string being encrypted based on a private key, and wherein the digital signature is verified through comparison with a signature generated by the at least one other server, the generated signature having a second generation time-stamp; and
    indicating a result of the verification, wherein the at least one server is synchronised with an identification device associated with the object.

11. The storage medium of claim 10, wherein adjacent ones of the pre-defined intervals are at least one minute apart.

12. The storage medium of claim 10, wherein the digital signature is generated using the data of the object, which includes identification information of the object, and a private key.

13. The storage medium of claim 12, wherein the digital signature is encoded in a two dimensional barcode, the two dimensional barcode including a string as its payload, the string including encrypted data based on the private key and data of the object.

14. A system for dynamic authentication of an object, the system comprising:
   a wireless transmission device including an identification device associated with the object;
   a mobile device configured to interface with the wireless transmission device for transmission of a digital signature, the digital signature being encoded in NFC Data Exchange Format (NDEF), the NDEF message being of type URI, and including a first string as its payload, wherein data in the first string being encrypted based on a private key; and
   a server configured to verify the digital signature transmitted at pre-defined intervals via the wireless transmission device, the digital signature including the first string having a first generation time-stamp and data of the object,
   wherein the server compares the digital signature to a signature generated by the server, the server generated signature having a second string that includes data of the object and a second generation time-stamp, and
   wherein the server is synchronised with the identification device.

15. The system of claim 14, wherein adjacent ones of the pre-defined intervals are at least one minute apart.

16. The system of claim 14, wherein the digital signature is generated using identification information of the object, and a private key.

17. A system for dynamic authentication of an object, the system comprising:
   a visual indicator including an identification device associated with the object, the visual indicator generating a digital signature based on the data of the object and a first generation time stamp;
   a mobile device configured to interface with the visual indicator to acquire the digital signature for transmission, the digital signature being encoded in NFC Data Exchange Format (NDEF), the NDEF message being of type URI, and including a first string as its payload, wherein data in the first string being encrypted based on a private key; and
   a server configured to verify the digital signature transmitted via the visual indicator at pre-defined intervals, the digital signature including a first string with a first generation time-stamp and an identifier of the object,
   wherein the server compares the transmitted digital signature with a signature generated by the server, the server generated signature including a second string that comprises the data of the object and a second generation time-stamp, and
   wherein the server is synchronised with the identification device.

18. The system of claim 17, wherein adjacent ones of the pre-defined duration intervals are least one minute apart.

19. The system of claim 17, wherein the digital signature is generated using the data of the object, which includes identification information of the object, and a private key.

20. The system of claim 19, wherein the digital signature is encoded in a two dimensional barcode, the two dimensional barcode including a string as its payload, the string including encrypted data based on the private key and data of the object.

* * * * *

UNITED STATES PATENT AND TRADEMARK OFFICE
CERTIFICATE OF CORRECTION

PATENT NO. : 10,396,998 B2  
APPLICATION NO. : 15/401614  
DATED : August 27, 2019  
INVENTOR(S) : Tang et al.

Page 1 of 1

It is certified that error appears in the above-identified patent and that said Letters Patent is hereby corrected as shown below:

On the Title Page

Item (72) Inventor(s): change the 9th inventor "Preshant Sridhar" to -- Prashant Sridhar --

Signed and Sealed this  
Nineteenth Day of November, 2019

Andrei Iancu  
*Director of the United States Patent and Trademark Office*